(12) United States Patent
Okajima

(10) Patent No.: US 12,177,400 B2
(45) Date of Patent: Dec. 24, 2024

(54) IMAGE FORMING DEVICE

(71) Applicant: BROTHER KOGYO KABUSHIKI KAISHA, Nagoya (JP)

(72) Inventor: Jun Okajima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/530,352

(22) Filed: Dec. 6, 2023

(65) Prior Publication Data

US 2024/0106955 A1    Mar. 28, 2024

Related U.S. Application Data

(62) Division of application No. 18/178,681, filed on Mar. 6, 2023, now Pat. No. 11,902,485.

(30) Foreign Application Priority Data

Mar. 7, 2022   (JP) .................................. 2022-034651

(51) Int. Cl.
    *H04N 1/00*    (2006.01)
(52) U.S. Cl.
    CPC ..... *H04N 1/00965* (2013.01); *H04N 1/00084* (2013.01); *H04N 1/0009* (2013.01); *H04N 1/00214* (2013.01); *H04N 1/00236* (2013.01)
(58) Field of Classification Search
    None
    See application file for complete search history.

(56) References Cited

U.S. PATENT DOCUMENTS

2009/0002733 A1* 1/2009 Kakigi ................. G06F 3/1204
                                                        358/1.9
2013/0332914 A1* 12/2013 Goda ....................... G06F 8/65
                                                        717/168

(Continued)

FOREIGN PATENT DOCUMENTS

JP       2019016221 A     1/2019

OTHER PUBLICATIONS

Notice of Allowance dated Oct. 5, 2023 from parent U.S. Appl. No. 18/178,681.

*Primary Examiner* — Akwasi M Sarpong
*Assistant Examiner* — Pawan Dhingra
(74) *Attorney, Agent, or Firm* — Scully, Scott, Murphy & Presser, PC

(57) ABSTRACT

An image forming device operates in a first operation when executing a first program and operates in a second operation when executing a second program. A controller of the image forming device transmits first USB configuration information to a terminal device when operated in a first operation and transmit second USB configuration information to the terminal device when operated in a second operation. The image forming device does not communicate with the terminal device when operated in the second operation in a case where the second USB configuration information is not transmitted to the terminal device, and communicates with the terminal device by transmitting the second USB configuration information in a case where operating in the second operation and communicating with the terminal device which receives the first USB configuration information.

4 Claims, 5 Drawing Sheets

(56) References Cited

U.S. PATENT DOCUMENTS

| | | | |
|---|---|---|---|
| 2014/0380310 A1* | 12/2014 | Wei | G06F 21/34 |
| | | | 718/1 |
| 2015/0067671 A1* | 3/2015 | Kamiya | H04N 1/00973 |
| | | | 717/174 |
| 2018/0173516 A1* | 6/2018 | Tung | G06F 8/654 |
| 2019/0205114 A1* | 7/2019 | Hamakawa | G06F 9/45558 |
| 2021/0022194 A1* | 1/2021 | Taylor | H04L 67/34 |
| 2021/0224004 A1* | 7/2021 | Nogawa | G06F 3/1204 |

* cited by examiner

IMAGE FORMING DEVICE

REFERENCE TO RELATED APPLICATIONS

This application is a divisional application of U.S. patent application Ser. No. 18/178,681 filed on Mar. 6, 2023 which claims priority under 35 U.S.C. § 119 from Japanese Patent Application No. 2022-034651 filed on Mar. 7, 2022. The entire subject matter of the application is incorporated herein by reference.

BACKGROUND ART

The present disclosures relate to an update of firmware of an image forming device.

There has been known a technique of updating firmware of a printer using firmware downloaded from a server to a PC.

There could be a case where updating of firmware of a printer is interrupted due to, for example, a power outage, and the updating is failed. In such a case, the printer may not operate properly.

DESCRIPTION

According to aspects of the present disclosure, there is provided an image forming device having multiple functions including an image forming function, comprising a USB interface, a memory, and a controller. The controller is configured to operate the image forming device in a first operation when executing a first program, operate the image forming device in a second operation when executing a second program without executing the first program, transmit first USB configuration information, as USB configuration information, to a terminal device via the USB interface when the image forming device operates in the first operation, transmit second USB configuration information, as the USB configuration information, to the terminal device via the USB interface when the image forming device operates in the second operation, not communicate with the terminal device via the USB interface when the image forming device operates in the second operation in a case where the second USB configuration information, which satisfies a particular relationship with the first USB configuration information, is not transmitted to the terminal device which receives the first USB configuration information from the image forming device operating in the first operation, and communicate with the terminal device, which has received the first USB configuration information from the image forming device operation in the first operation, via the USB interface by transmitting the second USB configuration information satisfying the particular relationship with the first USB configuration information which is transmitted from the image forming device operating in the first operation in a case where the image forming device operating in the second operation communicates, via the USB interface, with the terminal device which receives the first USB configuration information from the image forming device operating in the first operation.

Figure 1:
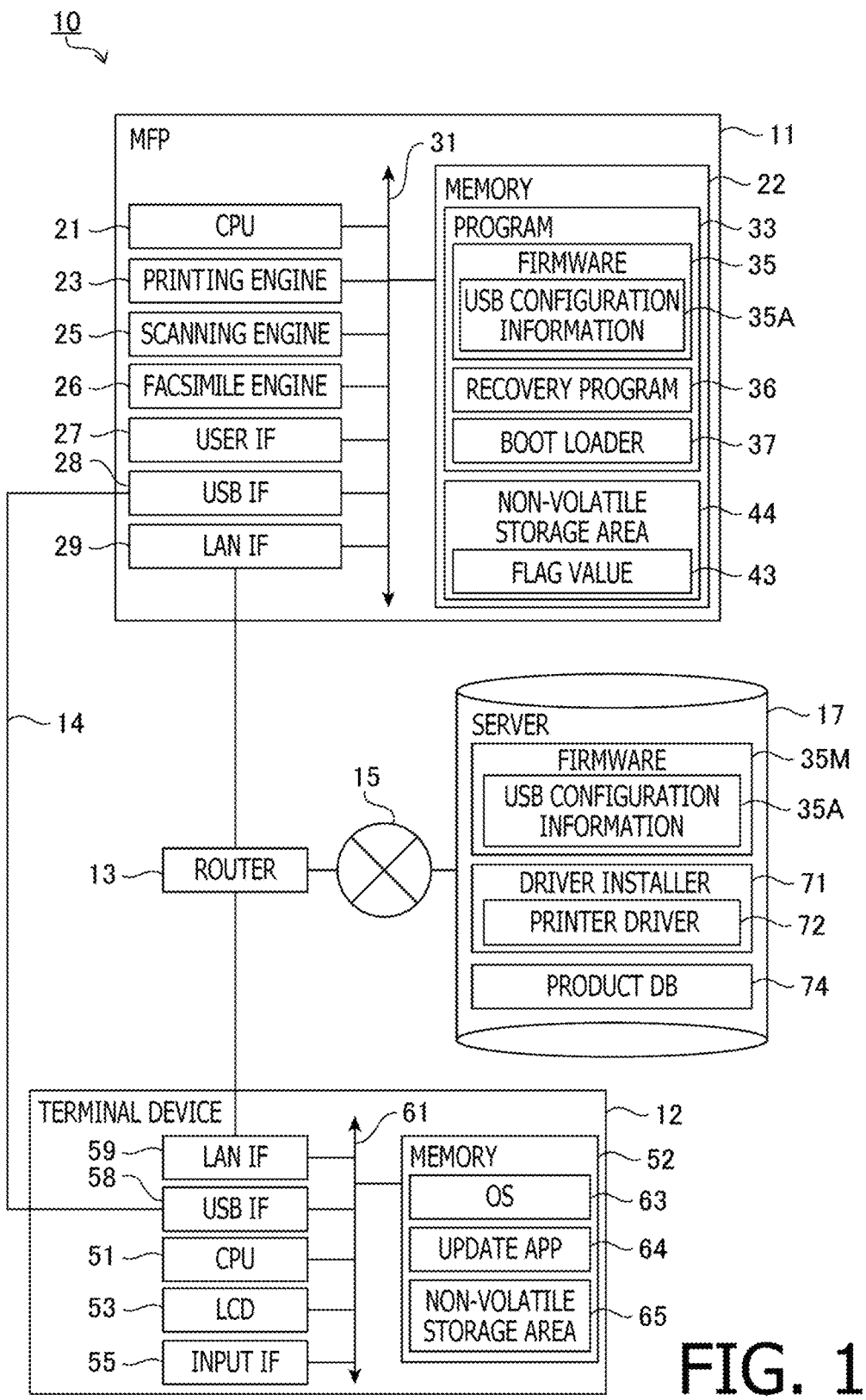
FIG. 1 is a block diagram showing a printing system.

Hereinafter, an image forming system according to aspects of the present disclosures will be described referring to a printing system 10 as an example. FIG. 1 is a block diagram showing a functional configuration of the printing system 10. As shown in FIG. 1, the printing system 10 has an MFP 11 and a terminal device 12. The MFP 11 includes a CPU 21, a memory 22, a printing engine 23, a scanning engine 25, a facsimile engine 26, a user IF (interface) 27, a USB IF 28, and a LAN IF 29. The above components are communicably interconnected via a bus 31. The CPU 21 is configured to perform various operations by executing programs stored in the memory 22. The MFP 11 is an example of an image forming device according to aspects of the present disclosures. The LAN IF 29 is an example of a communication interface according to aspects of the present disclosures.

The printing engine 23 is configured to print images on a sheet (e.g., a printing sheet, an OHP sheet and the like). As the printing engine 23, a configuration to perform printing in accordance with an inkjet printing method, or an electrophotographic imaging method may be employed. The scanning engine 25 is provided with a scanning sensor (e.g., a CIS or a CCD) configured to scan an image formed on an original document. The facsimile engine 26 is configured to transmit/receive facsimile data to/from another facsimile device via a data communication line (e.g. a telephone line).

The user IF 27 includes, for example, a touchscreen panel and button switches, and is configured to receive user operation to the touch panel and/or button switches and display information on a display (e.g., a display of the touch panel) for the user. The USB IF 28 is an interface enabling communication compliant with the USB standard, and is configured to be connected to USB devices such as a USB memory and other devices provide with a USB IF (e.g., the terminal device 12). The LAN IF 29 enables the printing system 10 to connect to the terminal device 12 and a network 15 through a router 13. It is noted that the communication between the MFP 11 and the terminal device 12 may be either a wired communication or a wireless communication.

The memory 22 is of a well-known configuration and includes a RAM, a ROM, an NVRAM, and/or an HDD. A program 33 to be executed by the CPU 21 is stored in the memory 22. The program 33 includes firmware 35, a recovery program 36, and a boot loader 37. The firmware 35 is a control program configured to control the MFP 11 to perform a printing process, a scanning process, a facsimile transmitting/receiving process, and a setting process of the MFP 11. The recovery program 36 is for a recovery operation. The boot loader 37 is a program to be executed when the MFP 11 is started. The memory 22 includes a nonvolatile storage area 44, which is, for example, a storage area in the NVRAM. The firmware 35 is an example of a first program according to aspects of the present disclosures. The recovery program 36 is an example of a second program according to aspects of the present disclosures. The nonvolatile storage area 44 is an example of a storage area first program according to aspects of the present disclosures.

It is noted that a medium storing the program 33 is not necessarily limited to the ROM, the RAM, the HDD built in the MFP 11 but a storage medium from/to which a computer can retrieve/write programs and data. It is noted that, according to aspects of the present disclosures, the storage medium from which the computer can read programs/data is a non-transitory medium. The non-transitory medium includes, beside the above example, a storage medium such as a CD-ROM, a DVD-ROM or the like are included. Further, the non-transitory medium is also a tangible medium. In contrast, an electrical signal carrying a program downloaded from, for example, a server on the Internet is a kind of the computer-readable medium, but not included in the non-transitory computer-readable storage medium.

The terminal device 12 is, for example, a personal computer. It should be noted, but, the terminal device according to the aspects of the present disclosures is not necessarily be the personal computer, and other terminals configured to perform information processing (e.g., a smartphone, a tablet terminal) may be used as the terminal device 12. The terminal device 12 incudes a CPU 51, a memory 52, an LCD 53, an input IF 55, a USB IF 58 and a LAN IF 59. Such components are communicably interconnected via a bus 61.

In the memory 52, an OS (operating system) 63 and an update app (application) 64 are stored. The OS 63 is a program integrally control the terminal device 12, and is configured to provide basic functions and services to application programs such as the update app 64. The OS 63 according to the present disclosures is an operating system of Windows (registered trademark of Microsoft Corporation), Mac (registered trademark of Apple Inc.), Linux (registered trademark of Linus Torvalds), Android (registered trademark of Google LLC.), iOS (registered trademark of Cisco Systems, Inc.), and the like.

The update app 64 is a program supplied, for example, by a vender of the MFP 11. The update app 64 is configured to perform a USB communication with the MFP 11 to cause the MFP 11 to perform a recovery operation to update firmware 35 (i.e., rewrite the firmware 35). The memory 52 has a non-volatile storage area 65, which is, for example, a storage area of an HDD or an SSD.

The LCD 53 functions as a displaying device to display various information regarding the terminal device 12. It is noted that the displaying device of the terminal device 12 is not necessarily limited to the LCD, but other displaying devices such as an organic EL display may be used optionally or alternatively. The input IF 55 is an input device such as a keyboard and a mouse. It is noted that the input IF 55 is not necessarily limited to the keyboard and the mouse, but other devices such as a touchscreen panel may be used optionally or alternatively.

A server 17 is connected to the network 15. The network 15 is, for example, the Internet. It is noted that the network 15 is not necessarily a WAN such as the Internet, but may be a LAN. The server 17 is, for example, a server managed by the vender of the terminal device 12. The server 17 stores firmware 35M, a driver installer 71, and a product DB 74. In the server 17, the firmware 35M for each model of the MFP 11 is stored. The driver installer 71 is configured to install a printer driver 72 enabling a communication with the MFP 11 via the LAN IF 28 or the USB IF 28. The printer driver 72 is a device driver to be installed to the terminal device 12 and perform a setting process for the MFP 11. Typically, the printer driver 72 is supplied by, for example, the vender of the MFP 11 and installed to the terminal device 12. The printer driver 72 is a program for transmitting a print instruction from the terminal device 12 to the MFP 11 or performing a setting process of the MFP 11. The non-volatile storage area 44 is an example of a driver according to aspects of the present disclosures.

Thus, the printing system 10 is a system configured such that, as the printer driver 72 being installed, the terminal device 12 transmits a print instruction to the MFP 11 and the MFP 11 performs the printing in response to the print instruction. In the following description, the printer driver 72 that performs the print instruction will be described mainly. It is noted that a scanner driver for executing a scan instruction to the scanning engine, and a facsimile application for executing a facsimile transmission and the like may also be installed to the MFP 11 at the time when the printer driver 72 is installed to the MFP 11. Alternatively, the scanner driver and the like may be installed to the MFP 11 in a process separate from the installation of the printer driver 72.

Figure 2:
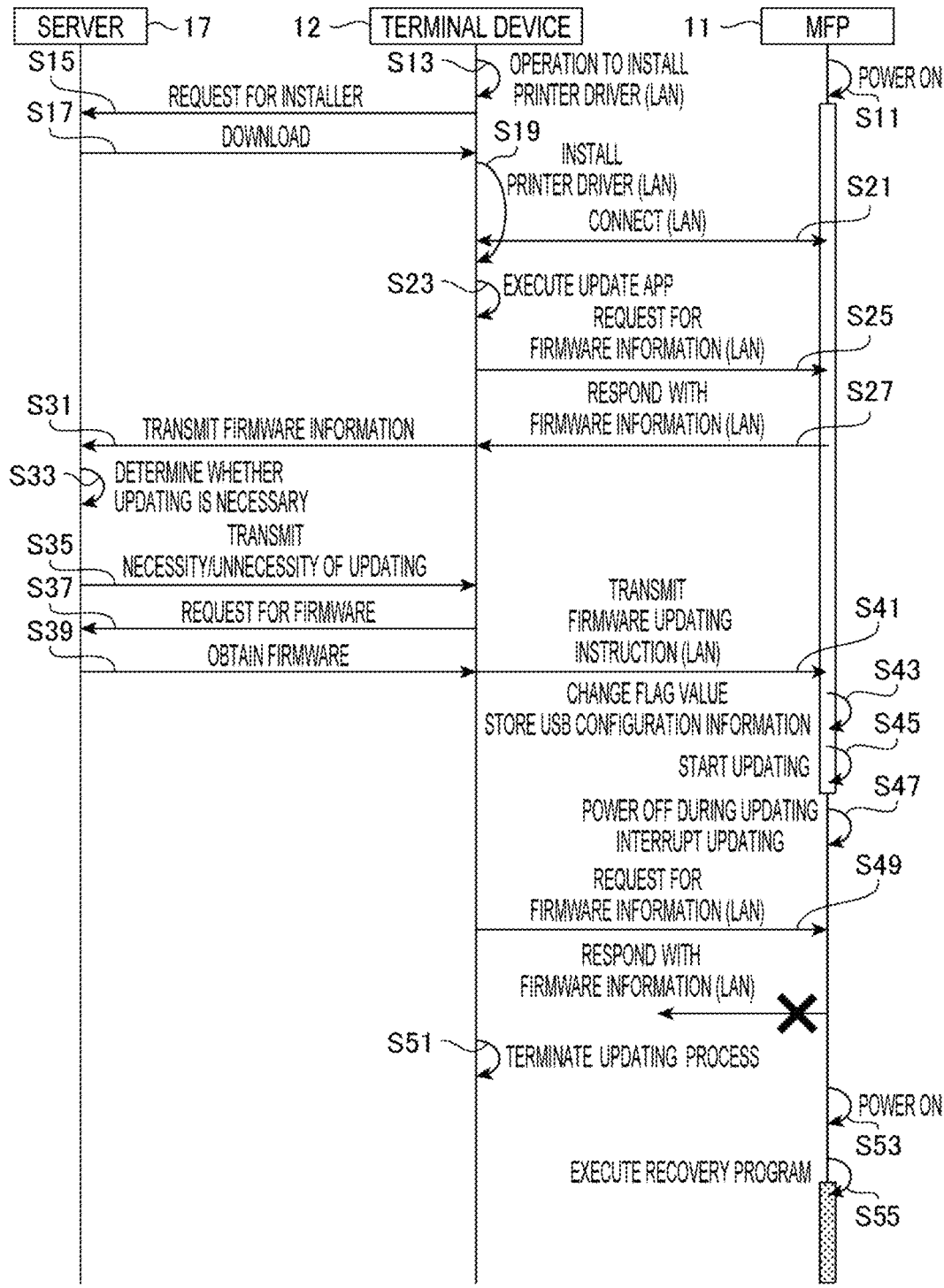
FIGS. 2 and 3 show a flow diagram illustrating installation and firmware updating.
Figure 3:
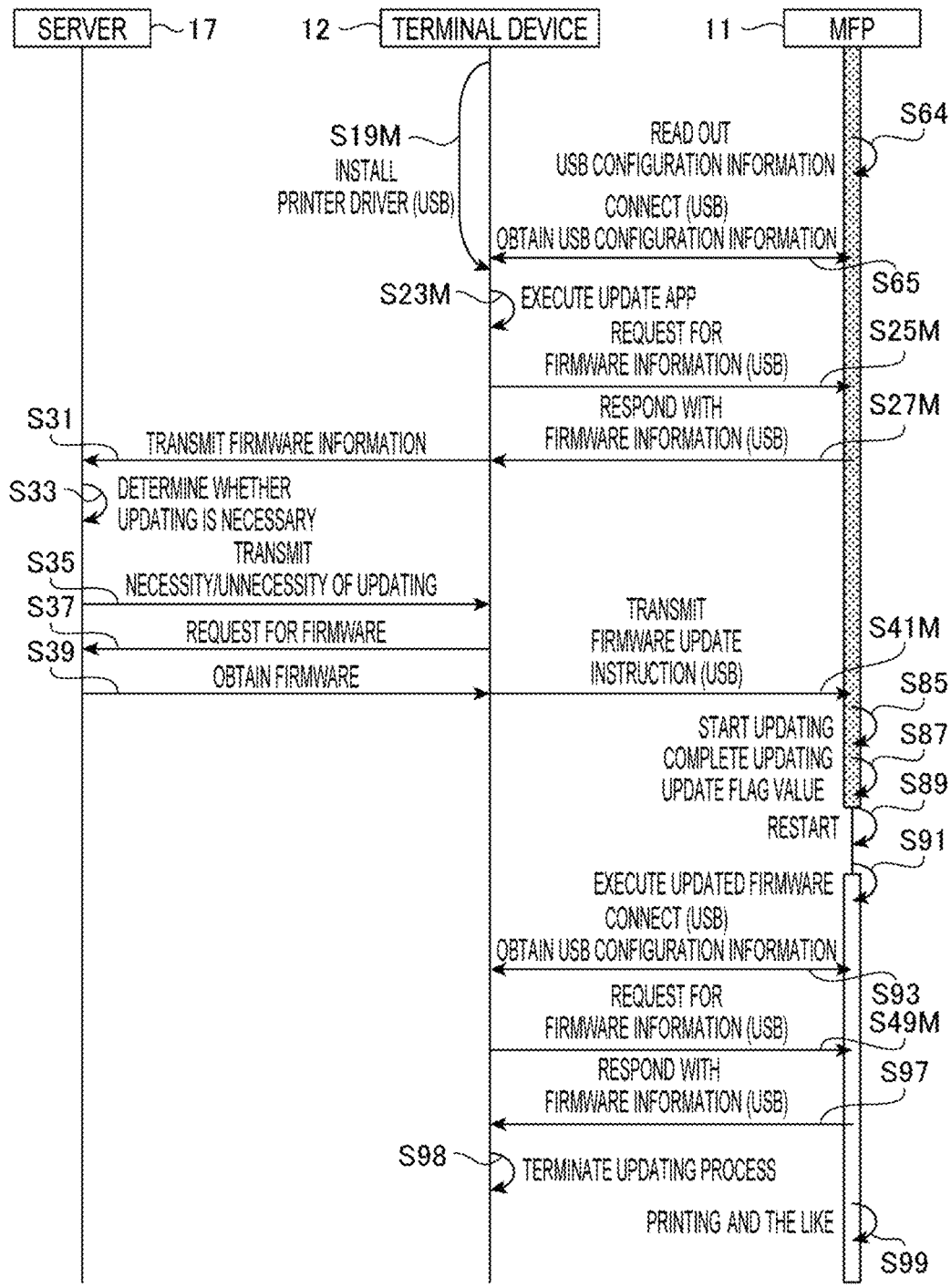

Next, an installing process of the printer driver 72 and an updating process of the firmware 35 of the printing system 10 will be described. FIGS. 2 and 3 show a flow diagram illustrating the installing process and the firmware updating process. Firstly, a case where updating of the firmware 35 is attempted by connecting the MFP 11 and the terminal device 12 via the wired LAN but the updating is failed, and then a recovery operation using the USB connection after the failure of the updating is performed is described.

It is assumed that, when a process shown in FIGS. 2 and 3 is started, the MFP 11 is in a state where the firmware 35 can be executed normally. Accordingly, it is assumed that, when the MFP 11 is powered on, the firmware 35 is started normally. It is further assumed that, the printer driver 72 corresponding to the MFP 11 has been installed in the terminal device 12. It should be noted that contents and the order of the processes indicated in FIGS. 2 and 3 are only examples. It is also noted that the MFP 11 and the terminal device 12 are configured such that a LAN communication via the LAN IFs 29 and 59, and a USB communication via the USB IFs 28 and 58 can be performed. In this regard, in FIGS. 2 and 3, according to which of the communication methods is used is indicated by letters "LAN" and "USB." Further, in each step of the flow diagrams, similar processes such as the installation are indicated with the same reference numerals, while in steps related to the USB communication," a letter "M" is suffixed so that a step related to the "USB communication" and a step related to the "LAN communication" are distinguished from each other (e.g., S19, S25, S27, S41 in FIG. 2 and S19M, S25M, S27M, S41M in FIG. 3).

Further, processes included in FIGS. 2 and 3 indicate, basically, processes performed by the CPU 21, the CPU 51, the server 17 and the like in accordance with commands described in the program 33 and the update app 64. That is, the processes of "receiving," "requesting," "executing," "obtaining," "determining," "instructing," and the like in the following description indicate those performed by the CPU 21, the CPU 51 and the like. The processes performed by the CPU 21, the CPU 51 and the like include hardware control.

In the following description, processes performed by the CPU 21, the CPU 51 and the like in accordance with commands described in the program may be described in a simplified manner. For example, a description "the MFP 11 obtains the firmware 35M via the LAN IF 29" may actually indicate that "the CPU 21 of the MFP 11 executes the program 33 to control the LAN IF 29 and obtain the firmware 35M." The same applies for the terminal device 12 and the server 17. Further, processes executed by the CPU 21, the CPU 51 and the like in accordance with commands described in the program may be described with the program name as the subject of the processes, as in "the program executes."

In the following description, a term "obtain" is used in a concept that does not require a "request." That is, a process of the MFP 11 to receive data without requesting for the data is also included in a concept of "the MFP 11 obtains the data." Further, the term "data" used throughout the specification, claims, abstract and drawings means data indicated by a bit array readable by a computer. Data having substantially the same semantic content but different formats will be treated as the same data. The term "information" is also treated in a similar manner. Further, the term "instruct" in the specification, claims, abstract and drawings means a concept of outputting information indicating that an instruction is being given. Further, information indicating that the instruction is being given is simply represented by a term "instruct."

When the MFP 11 is powered on, the user may turn on the MFP 11 with the LAN IF 29 of the terminal device 12 and the LAN IF 59 of the MFP 11 being connected with a LAN cable. When powered on, the MFP 11 executes, with the CPU 21, the boot loader 37 (S11 in FIG. 2).

As shown in FIG. 1, the non-volatile storage area 44 stores a flag value 43. When executed, the boot loader 37 reads out the flag value 43 from the non-volatile storage area 44 and determines whether to execute the firmware 35. As the flag value 43, either a first value instructing execution of the firmware 35 or a second value instructing execution of a recovery program 36 can be set. The MFP 11 is ready to be normally started as described above and the flag value 43 is set to the first value. Therefore, the boot loader 37 selects execution of the firmware 35. The MFP 11 executes the firmware 35 with the CPU 21 to start the printing system 10. Thus, the MFP 11 is in a normal state where the MFP 11 is capable of executing a printing function, a scanning function and the like. In the following description, a state where the image forming device executes the firmware 35 and operates as the MFP 11 having respective functions will be referred to as a normal operation state. In FIGS. 2 and 3, a white rectangle indicates that the MFP 11 is in the normal operation state. The normal operation is an example of a first operation according to aspects of the present disclosures.

Further, the terminal device 12 receives an operation to install the printer driver 72 of the MFP 11 (S13). For example, the user accesses the server 17 using browser software, selects the printer driver 72 that matches the model of the MFP 11, and performs an operation to download a driver installer 71 to install the printer driver 72. The MFP 11 requests, through the network 15, the server 17 for the driver installer 71 based on the user's operation (S15) and downloads the driver installer 71 from the server 17. The user operates the terminal device 12 to execute the downloaded driver installer 71. The driver installer 71 receives an instruction, from the user, to use the LAN IF 19 as the interface, and starts the installing process (S19). The driver installer 71 detects the MFP 11 connected to the designated interface (S21). In the following description, it is assumed that the LAN IF 29 is designated.

The driver installer 71 obtains information (e.g., the IP address, the printer name and the like) from the detected MFP 11, includes the information regarding the MFP 11 in port information, which is used to communicate with the MFP 11 to instruct printing via the network 15, stores the port information in the non-volatile storage area 65, and terminates the installing process of the printer driver 72 (S19). It is noted that a method of obtaining the printer driver 72 is not necessarily limited to the above method. For example, the driver installer 71 may not include the printer driver 72 and may be configured to download a necessary driver from the server 17. Alternatively, another software (e.g., the update app 64 or the OS 63) may download the necessary driver from the server 17.

The terminal device 12 executes the update app 64 in response to, for example, an operation input by the user, and receives an operation to execute updating of the firmware 35 (S23). The update app 64 is, for example, application software that can be installed in the terminal device 12. The user can obtain an installer of the update app 64 from the server 17 and execute the same to install the update app 64 similar to the installation of the printer driver 72. When executed, the update app 64 displays a list of the port information (i.e., the port information stored in S19 described above) registered with the terminal device 12 on the LCD 53, and communicates with the MFP 11 using the port information selected by the user (S23). That is, when the port information contains information necessary for communicating with the MFP 11 via the network 15, it becomes possible for the update app 64 to transmit firmware 35M for updating to the MFP 11 via the network 15. If, as will be described later, the port information contains information to communicate with the MFP 11 via the USB IFs 28 and 58, it becomes possible for the update app 64 to transmit the firmware 35M for updating to the MFP 11 via the USB IFs 28 and 58. In other words, as the printer driver 72 described above is installed in the terminal device 12, the terminal device 12 can not only instruct the MFP 11 to perform printing, but also be in a state for updating the firmware 35 of the MFP 11 via the LAN IF 29. The update app 64 requests the MFP 11 with which the update app 64 communicated in S23 for the firmware information (S25). In response to the request in S25, the MFP 11 transmits, as the firmware information, the type of the firmware 35 of the MFP 11 itself, the version of the firmware 35, the model name of the MFP 11, the product serial number and the like (S27).

The update app 64 transmits the firmware information obtained, for example, from the MFP 11, to the server 17 (S31). Then, the server 17 determines whether the firmware 35 of the MFP 11 is to be updated based on the information obtained from the update app 64 (S33). The product DB 74 of the server 17 stores, for example, a model name of each MFP 11, the number of the latest version of the firmware 35 for the model name, and a range of versions that need to be updated in an associated manner. For example, when a value of 0.75 is stored as the latest version number and when a value of 0.00 is stored as the minimum version number of the range and a value of 0.74 is stored as the maximum version number, it is meant that the firmware 35 in that model should be updated to version 0.75.

The server 17 detects the range of the version of the firmware 35 that need to be updated based on the model name obtained in S31. When the version of the firmware 35 obtained in S31 is within the range (i.e., versions 0.00-0.74), the server 17 determines that the updating is necessary, while the obtained version is the latest version, the server 17 determines that the updating is not necessary. Then, the server 17 transmits a determination result regarding necessity/unnecessity of updating to the terminal device 12 (S35). It should be noted that the information stored in the product DB 74 is an only an example. For example, the product DB 74 may store information in which only the name of the firmware and the version number of the latest version are associated with each other.

In this example, the updating of the firmware 35 is necessary. Therefore, the server 17 notifies the update app 64 that updating is necessary (S35). The update app 64 request the server 17 for the firmware 35M (S37) and obtains the latest version of the firmware 35M (S39). Then, the update app 64 transmits the obtained latest version of the firmware 35M to the MFP 11, and instructs the MFP 11 to update the firmware 35 to the firmware 35M (S41). It is noted that the updating of the firmware is not necessarily limited to the updating to the latest version. For example, the updating may be an update that rolls back to the previous version of the firmware in order to avoid defects in the latest version. The firmware 35M to be obtained from the server 17 may be only the data necessary to update the firmware 35 (i.e., difference data from the latest version), or it may be entire data of the latest version of the firmware 35M that can replace the firmware 35.

When receiving the instruction in S41, the firmware 35 changes the flag value 43 from the first value to the second value (S43) before starting the updating of the firmware 35. Further, the firmware 35 stores USB configuration information 35A (see FIG. 1) set as a program set to itself in the non-volatile storage area 44 (S43). The USB configuration information 35A is information to be transmitted to a device serving as a USB host when the USB host such as the terminal device 12 is connected to the USB IF 28 of the MFP 11 performing a normal operation to execute the firmware 35, and is information of so-called USB descriptor. In the USB configuration information 35A, information such as a device descriptor, a configuration descriptor, an interface descriptor and the like are set. Concretely, in the USB configuration information 35A, the model name of the MFP 11, the USB ID, information of the product serial number are set. The USB configuration information 35A is an example of a first USB configuration information according to aspects of the present disclosures.

Further, in the USB configuration information 35A, interface numbers and information of USB classes respectively corresponding to the interface numbers are stored as information of the interface descriptor. For example, in the USB configuration information 35A, four interface numbers from 0 to 3 (e.g., IF0-IF3) may be stored. Further, in the USB configuration information 35A, four interface numbers (i.e., IF0 to IF3) are respectively associated with a printer class, a scanner class, and classes of functions that can be defined by the vendor (a vendor function 1 and a vendor function 2) as the USB classes. These functions are realized by the MFP 11 when executing the firmware 35 and are functions that are provided when the MFP 11 performs its normal operation. For example, when the terminal device 12 is connected to a normally operating MFP 11 via USB communication (USB IFs 28 and 58), the terminal device 12 determines with which interface number of USB IFs 28 and 58 it should send and receive data corresponding to functions such as printing and scanning based on the USB configuration information 35A obtained from the MFP 11.

The image forming device according to aspects of the present disclosures is not necessarily limited to multi-function devices such as the MFP 11. That is, the image forming device may be, for example, a printer, a facsimile device, or a scanner. Accordingly, an image forming function according to aspects of the present disclosures may include a facsimile function, a scanner function as well as a printing function. A plurality of functions including the image forming function according to aspects of the present disclosures may include the image forming function such as the printing function, the facsimile function, the scanner function and another function (i.e., a function realized by executing the firmware 35 and not limited to the image forming function).

Further, the image forming system according to aspects of the present disclosures is not necessarily limited to the printing system, but may be a scanning system configured to perform only the scanning function, or a facsimile system configured to perform only the facsimile function. Further, the driver according to aspects of the present disclosures is not necessarily limited to the driver capable of performing multiple functions including, for example, the printing function, the scanning function and the facsimile function. The driver may be a driver which can realize only the printing function, or a driver which can realize only the scanning function. As classes of the vender functions 1 and 2, a class of the facsimile function, a class of accessing an EWS (embedded web server) of the MFP 11, or a class of the scanning function may be defined.

When the firmware 35 has completed storing the USB configuration information 35A, the MFP 11 starts a process of updating the firmware 35 to the latest version using the firmware 35M (S45). Based on the firmware 35M obtained from the terminal device 12, the MFP 11 sequentially updates the programs included in the firmware 35 (S45). If the updating of the firmware 35 has been successfully completed, the MFP 11 is started by the latest firmware 35 and is in the normally operated state. In the example shown in FIG. 2, however, the MFP 11 is powered off during the updating process of the firmware 35 and the updating process is interrupted (S47). The cause of the interruption of the updating process is not limited to power off, but can also be, for example, a communication breakdown between the MFP 11 and the terminal device 12.

After a particular time period has been elapsed since the updating instruction was transmitted in S41, the update app 64 requests the MFP 11 for the firmware information (S49) and confirms the completion of the updating of the MFP 11. The particular time period is, for example, a waiting time corresponding to a time period necessary for the MFP 11 to update the firmware 35. It is noted that the communication contents in S49 is basically the same as those in S25. If a reply similar to that in S27 (e.g., the version information and the like) is received, the update app 64 finishes the updating. However, according to the present example, the MFP 11 is powered off. Therefore, the update app 64 does not receive a reply from the MFP 11 (see the crossed-out mark in FIG. 2), detects a timeout and terminates the updating process (S51).

When, for example, the update app 64 starts the updating instruction in S41, the update app 64 displays a progression status of the transmission of the firmware 35M as a progress bar on the LCD 53. When the transmission of the firmware 35M is finished, the update app 64 sets the progression status of the progress bar to "90%." Since there are no replies in S49, the progression status of progress bar will remain at "90%." As a result, the user recognizes that the updating of the firmware has not been completed.

Next, in S53, the MFP 11 is powered on again. Since the flag value 43 is set to the second value, the boot loader 37 selects the startup of the recovery program 36. Accordingly, the MFP 11 executes the recovery program 36 with the CPU 21, and is in a recovery operating state (S55). In FIGS. 2 and 3, the recovery operation state is indicated by dotted rectangles. During the recovery operating state, the recovery program 36 restricts the functions of the MFP 11. For example, the recovery program 36 displays a message "Currently in Recovery Mode" on the touch panel of the user IF 27 and no user operations to the touch panel are received. Further, the recovery program 36 may not execute the communication via the LAN IF 29, but performs only the communication via the USB IF 28. The recovery operation is an example of a second operation according to aspects of the present disclosures.

The user checks the above-mentioned display and a manual of the MFP 11, determines that the recovery using the USB connection is necessary, connects the USB IFs 28 and 48 with the USB cable 14 (see FIG. 1), and executes, for example, the driver installer 71 that has been downloaded in S17 to install the printer driver 72 in the terminal device 12 to perform setting of the USB communication (see S19M in FIG. 3). The driver installer 71 receives, for example, in the installing process, an instruction to use the USB IF 28 and detects the MFP 11 connected to the USB IF 28. The driver installer 71 includes the USB ID and the information regarding the printer name and the like obtained from the MFP 11 in port information, which is information used for communication via the USB cable when the print instruction is transmitted to the MFP 11, and stores the port information in the non-volatile storage area 65 (S19M, S65). When detecting the terminal device 12 connected to the USB IF 58 by the well-known PnP (plug and play) function, the recovery program 36 executes the configuration of the USB communication with the OS 63 (S65). In this configuration, the recovery program 36 reads out the USB configuration information stored in the non-volatile storage area 44 by the firmware 35, that is, the information regarding the interface descriptor and the like which are used in the normal operation (S64), and transmits the read USB configuration information 35A to the terminal device 12 (S65). The process of S19M is an example of an installing process according to aspects of the present disclosures. The USB configuration information 35A is an example of a second USB configuration information according to aspects of the present disclosures.

The OS 63 stores, in the installing process mentioned above, the printer driver 72 subject to the installation, the obtained USB configuration information 35A, the printer name of the MFP 11 and the like in the non-volatile storage area 65 in an associated manner. Further, the OS 63 transmits the print instruction and the like to the MFP 11 using an interface according to the type of data via the associated printer driver 72 based on the interface descriptor contained in the USB configuration information 35A stored in the non-volatile storage area 65.

When the installation is completed, the user executes the update app 64 (S23M). The update app 64 communicates with the server 17 and the MFP 11 and sends the updating instruction to update the firmware to the MFP 11 (S25M, S27M, S31-S39, S41M). The communication with the MFP 11 is performed via the USB IF 28. The recovery program 36 responds with the model name of the firmware information based on the USB configuration information 35A stored, in S43, in the non-volatile storage area 44 (S27M).

The recovery program 36 responds with a value, for example, of "0.00" as a version of the firmware information (S27M). Then, the server 17 determines that the updating must be performed (S33), thereby the updating of the firmware 35 being executed (S41M). It is noted that the recovery program 36 may respond with the version of the firmware 35 before the updating.

When the recovery program 36 obtains the firmware 35M from the terminal device 12 (S41M), as in S45, the recovery program 36 updates the program contained in the firmware 35 which has been failed to be updated based on the firmware 35M (S85). When the updating is completed, the recovery program 36 updates the flag value 43 from the second value to the first value (S87). Then, the recovery program 36 restarts the MFP 11 (S89). The boot loader 37 executed after the restart of the MFP 11 selects the execution of the firmware 35 since the first value is stored as the flag value 43. The MFP 11 performs the normal operation with the updated firmware 35 (S91). The process of S85 is an example of a firmware updating process according to aspects of the present disclosures.

When the MFP 11 is restarted, the communication between the terminal device 12 and the MFP 11 is once disconnected. After the MFP 11 is restarted, the MFP 11 executes the configuration of the USB connection with the terminal device 12 (S93). The firmware 35 transmits, to the OS 63, the USB configuration information 35A set to the program of the firmware 35 itself (S93).

In S65, the recovery program 36 transmits the USB configuration information 35A stored by the firmware 35 which had not yet been updated to the OS 63. In S93, the updated firmware 35M transmits the USB configuration information 35A set to the firmware 35M itself to the OS 63. When the USB configuration information 35A stored in the non-volatile storage area 65 in S65 and the USB configuration information 35A obtained in S93 are completely identical, the OS 63 continues the USB communication. In contrast, when they are not identical to each other, even if the USB communication is configured not to continue the USB communication, the OS 63 continues the USB communication since the USB configuration information 35A set to the updated firmware 35M is identical to the USB configuration information 35A set to the firmware 35 before updated, and therefore. After transmitting the updating instruction in S41M, the update app 63 requests the MFP 11 for the firmware information (S49M) after a particular time period necessary for the updating, the OS 63 can obtain the firmware information from the firmware 35 after elapsing of a particular time period necessary for the updating (S97). The completely identical relationship of the USB configuration information 35A is an example of a particular relationship according to aspects of the present disclosures.

When the update app 64 executes, for example, the updating instruction in S41M and completes transmitting of the firmware 35M, the update app 64 sets the progression status of the progress bar displayed on the LCD 53 to "90%." When obtaining the response in S97, the update app 64 sets the procession status to "100%," and display a completion message such as "Updating is Completed." In this way, it is possible to have the user recognize that the updating of the firmware has been successfully completed. Thereafter, when the update app 64 determines, based on the version of the obtained firmware information, that the updating is normally completed, the update app 64 terminates the updating process (S98). The MFP 11 normally operates with the updated firmware 35 and is in a state to receive the print instruction and the like (S99). As described above, by making the USB configuration information 35A when the printer driver 72 that executes the USB communication is installed and the USB configuration information 35A transmitting the updated firmware 35M the same, it becomes possible to have the OS 63 continue the USB communication, and to have the recovery of the firmware 35 be completed normally.

It is noted that the firmware 35 may have different specifications for different models of the MFP 11 with different functions. In addition, even within a single product series where the models are identical, models with different functions may be developed. The USB configuration information 35A that the firmware 35 transmits when performing the USB communication will be different for different functions. In contrast, the recovery program 36 is configured to transmit the USB configuration information 35A stored by the firmware 35 before the updating in S65. Therefore, there is no need to develop the recovery program 36, for each of models with different functions, in which the USB configuration information 35A is set according to the different functions. In other words, the recovery program 36 can be used commonly in different models of the MFP 11. In S27M, the recovery program 36 responds with the model name of the firmware information based on the USB configuration information 35A stored in the non-volatile storage area 44 in S43. In this way, the recovery program 36 itself does not need to have the model name information.

If a recovery operation is performed, the firmware 35 is in an interrupted state and the program data may be corrupted. In such a case, it will be difficult for the recovery program 36 to obtain the USB configuration information 35A from the firmware 35 when the recovery operation is performed. Therefore, after the firmware 35 before the updating receives a request for updating from the terminal device 12 in S41 during the normal operation, the USB configuration information 35A is stored in the non-volatile storage area 44 before the updating is started in S45. As a result, the recovery program 36 can obtain the USB configuration information 35A from the non-volatile storage area 44 and transmit the same (S65) when performing the USB communication with the terminal device 12 during the recovery operation. That is, the USB communication can be continued. It is noted that the firmware 35 may delete the USB configuration information 35A from the non-volatile storage area 44 at the time of response in S97 or at any suitable point in time.

It is noted that the USB communication may be continued even when the USB configuration information 35A stored in the non-volatile storage area 65 in S65 and the USB configuration information 35A obtained by the terminal device 12 in S93 have a particular relationship other than the complete match. The particular relationship may be, for example, a relationship in which a portion of the USB configuration information 35A stored in the non-volatile storage area 65 and the USB configuration information 35A obtained by the terminal device 12 in S93 match. The portion may be, for example, the portion required for the OS 63 to perform USB communication with the MFP 11. In this case, it is not necessary that the firmware 35 before the updating and the firmware 35M after the updating have the same USB configuration information 35A, but only have the USB configuration information satisfying the particular relationship with each other. In this case, the USB configuration information 35A may be changed in the MFP 11 that is performing the normal operation. In this case, the firmware 35 will store the modified USB configuration information 35A in the non-volatile storage area 44 before starting the updating in S45.

In the above, it is explained that the USB configuration information 35A for each model is not set in the recovery program 36, and the advantages of such a configuration are explained. However, the USB configuration information 35A for each model, which is equivalent to the firmware 35, can be set in the recovery program 36, and the USB configuration information 35A set in the recovery program 36 itself may be transmitted, for example, in S65. In this configuration, the USB configuration information 35A can be matched and the USB communication can be continued and the updating can be completed. It is noted that different model name information for each model may be set in the recovery program 36.

When the MFP 11 performs the installation process during the recovery operation, the MFP 11 transmits the USB configuration information 35A to the terminal device (S93), which is to be transmitted in the normal operation to execute the updated firmware 35. As a result, the USB configuration information 35A during the installation process and the USB configuration information 35B transmitted during the normal operation from the MFP 11 that was successfully updated during the recovery operation satisfy the particular relationship. Therefore, the update app 64 can obtain the firmware information (S97) and normally terminate the updating process.

Next, a modification of the above-described MFP 11 will be described. In the following description, the same details as in the above-described MFP 11 will be omitted as appropriate. The configuration of the modified printing system 10 is the same as the configuration shown in FIG. 1.

Figure 4:
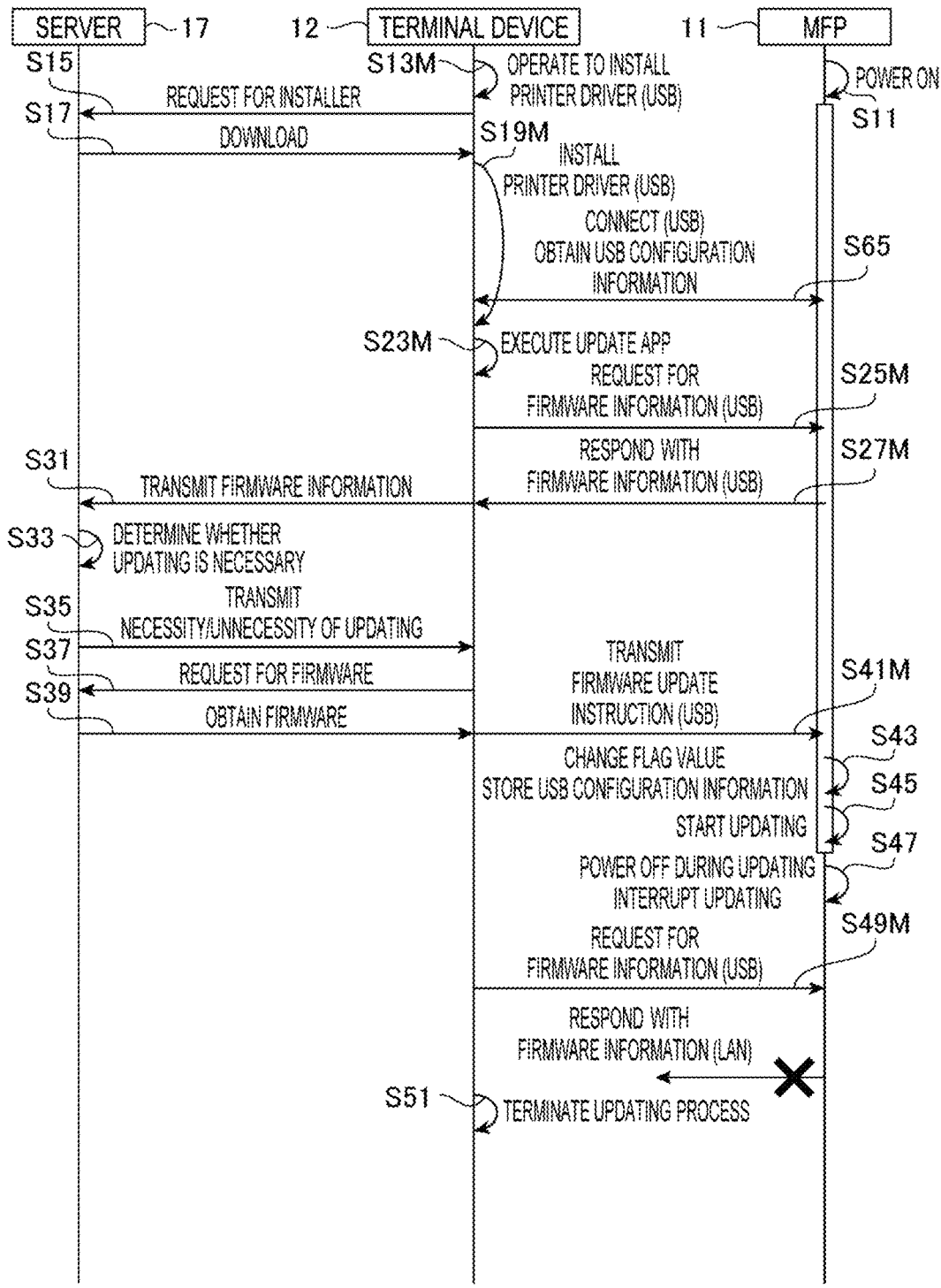
FIG. 4 shows a flow diagram illustrating installation and firmware updating according to a modification.

As shown in FIG. 4, the terminal device 12 executes the installation of the printer driver 72 with the driver installer 71 that has received the instruction to use the USB IF 28 (S13M-S19M, S65). The OS 63 stores the USB configuration information 35A obtained from the MFP 11 performing the normal operation in S65 in the non-volatile storage area 65 (S19M) in association with the MFP 11. The firmware 35 transmits the USB configuration information 35A having been programmed to itself in S65. Next, the update app 64 executed in the terminal device 12 communicates with the MFP 11 and the server 17 as in the above-described embodiment, the updates the firmware 35 (S23M-S41M). At this stage, the terminal device 12 communicates with the MFP 11 vial the USB IFs 28 and 58 (S25M, S27M, S41M). As in the above-described embodiment, the firmware 35 of the MFP 11 starts the updating of the firmware 35 after storing the USB configuration information 35A in the non-volatile storage area 44 (S43). However, when the MFP 11 is powered off or due to some reason, the updating is failed (S47). In such a case, the update app 64 is unable to confirm the updating, and detects a timeout (S49M, S51).

Figure 5:
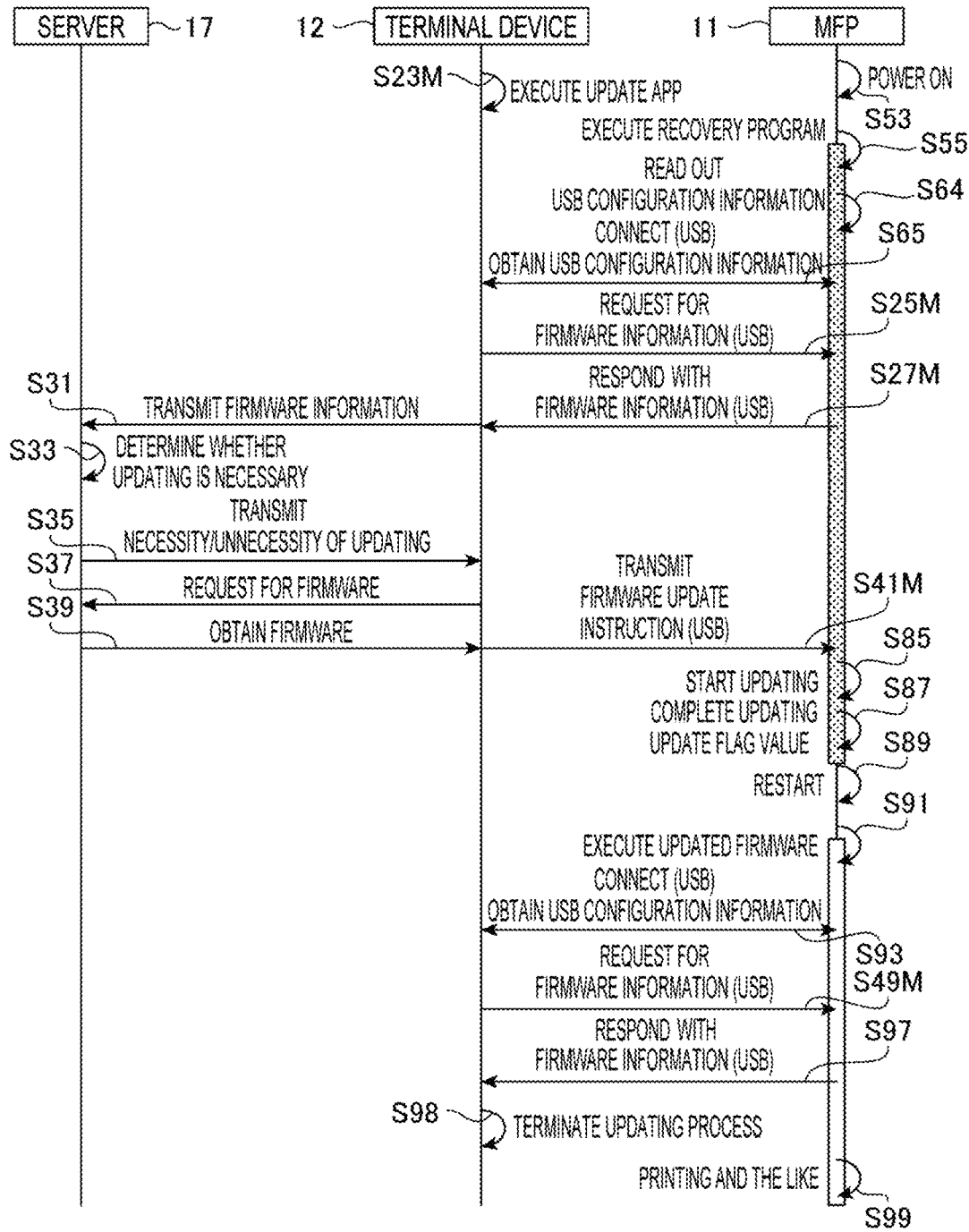
FIG. 5 shows a flow diagram illustrating installation and firmware updating according to a modification.

As shown in FIG. 5, when the update app 64 is executed (S23M) and the MFP 11 is powered off in a state where the MFP 11 is connected with the USB cable 14 (S53, S55), the terminal device 12 executes the configuration (S64, S65). In the configuration, the recovery program 36 reads out the USB configuration information 35A stored in S43 during the normal operation from the non-volatile storage area 44 and transmits the same to the OS 63 (S65). In this way, the USB configuration information 35A stored in the non-volatile storage area 65 during the installation process (S65) and the USB configuration information 35A received prior to the updating of the firmware 35 (S93) satisfy a particular relationship, and therefore the OS 63 continues the USB communication. As a result, the update app 64 can transmit the firmware 35M for the updating to the MFP 11 (S41M), the firmware 35 can be updated and the recovery program 36 is normally terminated (S25M onwards).

The process of S19M is an example of an installing process according to aspects of the present disclosures. The processes of S41M and S85 are examples of an installing process according to aspects of the present disclosures.

As described above, according to the modification, effects the same as those of the above-described embodiment can be obtained. For example, as the MFP 11 transmits the USB configuration information 35A stored in the non-volatile storage area 44 during the installation to the terminal device 12, the OS 63 is controlled to continue the USB communication, thereby continuing the recovery of the firmware 35.

It is noted that when receiving an instruction from the user to start the updating process in S23M, the update app 64 may obtain the information from the MFP 11 connected to the USB IF 58 and perform the USB communication with the MFP 11 using the obtained information (S23M) in the same way as the driver installer 71. Further, the update app 64 may store the obtained information in the non-volatile storage area 65. Then, in a case where the update app 64 stores the obtained information in the non-volatile storage area 65 and the updating of the firmware 35 has not been normally terminated, when the update app 64 receives the start instruction of the updating process from the user again, the update app 64 may obtain the information from the MFP 11 connected to the USB IF 58. The update app 64 continues the USB communication when the USB configuration information 35A stored in the non-volatile storage area 65 and the obtained USB configuration information 35A are completely identical, while discontinuing the USB communication when the USB configuration information 35A stored in the non-volatile storage area 65 and the obtained USB configuration information 35A are not identical. Even though configured as above, since the USB configuration information 35A stored in the non-volatile storage area 65 and the obtained USB configuration information 35A are identical, the USB communication can be continued in order to update the firmware 35.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

The MFP 11 may be configured in such a manner that updating of the firmware 35 can be performed by a method other than the update app 64. The MFP 11 may be configured, for example, to update the firmware 35 by reading the firmware 35M from a USB memory connected to the USB IF 28 during the normal operation. In this case, if the firmware 35 is configured to change the flag value 43 from the first value to the second value before the update of the firmware 35, as in S43, the recovery operation by the recovery program 36 can be performed even if the updating of the firmware 35 is failed, and the recovery of the firmware updating using the recovery program 36 can be performed.

Although the memory according to aspects of the present disclosures is not necessarily limited to a particular one, a memory having non-volatility (e.g., an HVRAM, and HDD) is particularly preferred.

A storage area for storing the USB configuration information 35A is not necessarily limited to the non-volatile storage area 44. For example, if the transition from the recovery operation to the normal operation is not accompanied by a power on/off operation such as rebooting, the USB configuration information 35A may be stored in a volatile area.

The update app 64 uses the port information stored by the driver installer 71 in S23 and S23M, but the method of obtaining the port information is not necessarily limited to this. For example, the update app 64 may obtain information equivalent to the port information by querying the printer driver 72 and communicating with the MFP 11. The update app 64 may also obtain information equivalent to the port information and communicate with the MFP 11 by inquiring the OS 63 or an app different from the update app 64. Alternatively, the update app 64 may obtain information equivalent to the port information from a data source different from the port information stored by the driver installer 71 and communicate with the MFP 11. For example, the update app 64 may obtain information equivalent to the port information from the registry of the operating system of the Windows (registered trademark of Microsoft) or from the configuration information of an application other than the update app 64.

In the above-described embodiment, the LAN IF 29 is used as the communication interface according to the present disclosures. However, the communication interface is not limited to the LAN IF 29. For example, a wireless LAN IF or Bluetooth (registered trademark of Bluetooth SIG) interface may also be used as the communication interface.

In each of the above-described embodiment and modification, the normal operation is employed as the first operation and the recovery operation is employed as the second operation, but the first operation and the second operation are not necessarily limited to the above. The second operation may be, for example, an operation in a safe mode in which the operation is started with some of the functions of the normal operation being limited. Even in this case, occurrence of communication errors can be suppressed by making the USB configuration information 35A transmitted from MFP 11 in the safe mode and the USB configuration information 35A transmitted during the normal operation the same.

In each of the above-described embodiment and modification, as the "condition that prevents the first operation" according to the present disclosures, the condition of executing the process of rewriting the firmware 35 is adopted, but the condition is not necessarily limited to this. As the condition that prevents the first operation, a condition to execute a mode that does not result in the normal operation, such as the condition to execute a safe mode, as described above, may be adopted. That is, the USB configuration information that has a particular relationship with the USB configuration information 35A transmitted from the MFP 11 to the terminal device 12 when the MFP 11 performs the normal operation should be transmitted from the MFP 11 to the terminal device 12 when the MFP 11 operates in the safe mode, thereby the USB communication being continued. In this way, since the USB communication with the MFP 11 performing the normal operation, and with the MFP 11 performing the recovery operation is maintained as in the above-described embodiment and modifications, particular processes (e.g., the firmware updating process) can be executed normally.

The controller according to the present disclosures is not necessarily limited to the CPU 21. The controller may be an ASIC or other logic integrated circuit, or a configuration in which the CPU, the ASIC and/or other logic integrated circuits cooperate.

What is claimed is:

1. An image forming device having multiple functions including an image forming function, comprising:
   a USB interface;
   a memory; and
   a controller,
   wherein the controller is configured to:
      operate the image forming device in a first operation when executing a first program;
      operate the image forming device in a second operation when executing a second program without executing the first program;
      transmit first USB configuration information, as USB configuration information, to a terminal device via the USB interface when the image forming device operates in the first operation;

transmit second USB configuration information, as the USB configuration information, to the terminal device via the USB interface when the image forming device operates in the second operation;

not communicate with the terminal device via the USB interface when the image forming device operates in the second operation in a case where the second USB configuration information, which satisfies a particular relationship with the first USB configuration information, is not transmitted to the terminal device which receives the first USB configuration information from the image forming device operating in the first operation; and communicate with the terminal device, which has received the first USB configuration information from the image forming device operation in the first operation, via the USB interface by transmitting the second USB configuration information satisfying the particular relationship with the first USB configuration information which is transmitted from the image forming device operating in the first operation in a case where the image forming device operating in the second operation communicates, via the USB interface, with the terminal device which receives the first USB configuration information from the image forming device operating in the first operation.

2. The image forming device according to claim 1,
wherein the controller is configured to:
    store the first USB configuration information in the memory when a condition that prevents the first operation is occurred while the image forming device operates in the first operation; and
    obtain the first USB configuration information stored in the memory and transmit the obtained first USB configuration information to the terminal device as the second USB configuration information while the image forming device operates in the second operation.

3. The image forming device according to claim 1,
wherein the USB configuration information includes an interface number of an interface descriptor compliant with a USB standard and information of a USB class corresponding to the interface number.

4. The image forming device according to claim 1, further configured to transmit, as information satisfying the particular relationship, information same as the USB configuration information to the terminal device via the USB interface.

* * * * *